US008577550B2

(12) United States Patent
Lu et al.

(10) Patent No.: US 8,577,550 B2
(45) Date of Patent: Nov. 5, 2013

(54) SYSTEM FOR VEHICLE CONTROL TO MITIGATE INTERSECTION COLLISIONS AND METHOD OF USING THE SAME

(75) Inventors: Jianbo Lu, Livonia, MI (US); Priya Prasad, Plymouth, MI (US); Panagiotis Tsiotras, Atlanta, GA (US); Efstathios Velenis, Uxbridge (GB); Dimitar Petrov Filev, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1042 days.

(21) Appl. No.: 12/573,504

(22) Filed: Oct. 5, 2009

(65) Prior Publication Data

US 2011/0082623 A1 Apr. 7, 2011

(51) Int. Cl.
*B62D 6/00* (2006.01)
(52) U.S. Cl.
USPC .............. 701/41; 701/45; 701/48; 701/300; 701/301; 701/302; 340/435; 340/436; 342/70; 342/71; 342/72
(58) Field of Classification Search
USPC ........................................................ 180/6.2
See application file for complete search history.

(56) References Cited

U.S. PATENT DOCUMENTS

| | | | | |
|---|---|---|---|---|
| 6,097,332 A * | 8/2000 | Crosby, II | ................. | 342/72 |
| 6,199,001 B1 | 3/2001 | Ohta et al. | | |
| 6,405,132 B1 * | 6/2002 | Breed et al. | ................. | 701/301 |
| 6,442,484 B1 * | 8/2002 | Miller et al. | ................. | 701/301 |
| 7,018,004 B2 * | 3/2006 | Chen et al. | ................. | 303/193 |
| 7,165,644 B2 * | 1/2007 | Offerle et al. | ................. | 180/244 |
| 7,229,139 B2 * | 6/2007 | Lu et al. | ................. | 303/140 |
| 7,565,234 B2 * | 7/2009 | Noda et al. | ................. | 701/70 |
| 7,806,486 B2 * | 10/2010 | Bitz | ................. | 303/20 |
| 8,289,187 B1 * | 10/2012 | Kerr | ................. | 340/905 |
| 2002/0036584 A1 * | 3/2002 | Jocoy et al. | ................. | 342/70 |
| 2003/0038715 A1 * | 2/2003 | Engelman et al. | ................. | 340/439 |
| 2003/0065432 A1 | 4/2003 | Shuman et al. | | |
| 2003/0191568 A1 * | 10/2003 | Breed | ................. | 701/36 |
| 2004/0019420 A1 * | 1/2004 | Rao et al. | ................. | 701/45 |
| 2004/0117116 A1 * | 6/2004 | Rao et al. | ................. | 701/301 |
| 2004/0193347 A1 * | 9/2004 | Harumoto et al. | ................. | 701/45 |
| 2004/0193372 A1 * | 9/2004 | MacNeille et al. | ................. | 701/213 |
| 2004/0254729 A1 * | 12/2004 | Browne et al. | ................. | 701/301 |
| 2005/0110673 A1 * | 5/2005 | Izumi et al. | ................. | 342/70 |

(Continued)

OTHER PUBLICATIONS

Intersection Collision Avoidance Using Its Countermeasuers; U.S. Department of Transportation; National Highway Traffic Safety Administration; Sep. 2000, 170 pages.

*Primary Examiner* — Jonathan M Dager
(74) *Attorney, Agent, or Firm* — Franklin MacKenzie; Ford Global Technologies, LLC

(57) ABSTRACT

A control system and method to mitigate intersection crashes is disclosed. In one embodiment, the system includes an electronic control module equipped with memory and in communication with at least one radar sensor system, at lest one environmental sensor system, at least one vehicle stability system, an operator advisory system, a brake control system, a controllable steering system, and a powertrain control system. In one embodiment, the method may include determining whether a vehicle is entering an intersection, determining whether the operator is responding correctly to the sensed conditions in the intersection, activating the controlled brakes, determining any intersection threat, determining whether any sensed threat is imminent, activating the accident mitigation adviser, reducing engine torque while in the intersection, and actuating steering and brake control systems while in the intersection.

12 Claims, 4 Drawing Sheets

(56) References Cited

U.S. PATENT DOCUMENTS

| | | | |
|---|---|---|---|
| 2005/0116538 A1* | 6/2005 | Sekine | 303/146 |
| 2005/0206234 A1* | 9/2005 | Tseng et al. | 303/146 |
| 2005/0267683 A1* | 12/2005 | Fujiwara et al. | 701/301 |
| 2006/0001531 A1* | 1/2006 | Waterman | 340/438 |
| 2006/0097570 A1* | 5/2006 | Doerr et al. | 303/193 |
| 2006/0195231 A1* | 8/2006 | Diebold et al. | 701/1 |
| 2006/0293819 A1 | 12/2006 | Harumoto et al. | |
| 2007/0067085 A1* | 3/2007 | Lu et al. | 701/70 |
| 2007/0168128 A1* | 7/2007 | Tokoro et al. | 701/301 |
| 2008/0133136 A1 | 6/2008 | Breed et al. | |
| 2008/0312834 A1* | 12/2008 | Noda et al. | 701/301 |
| 2008/0319610 A1* | 12/2008 | Oechsle et al. | 701/41 |
| 2009/0076702 A1* | 3/2009 | Arbitmann et al. | 701/96 |
| 2009/0143987 A1* | 6/2009 | Bect et al. | 701/301 |
| 2009/0210114 A1* | 8/2009 | Baumann et al. | 701/45 |
| 2010/0017066 A1* | 1/2010 | Lu et al. | 701/45 |
| 2010/0023226 A1* | 1/2010 | Ito | 701/46 |

\* cited by examiner

SYSTEM FOR VEHICLE CONTROL TO MITIGATE INTERSECTION COLLISIONS AND METHOD OF USING THE SAME

TECHNICAL FIELD

According to the NHTSA report DOT HS 809 171 entitled "Intersection Collision Avoidance Using ITS Countermeasures" dated September, 2000, approximately 43.9% of all intersection collisions or crashes between vehicles occur when one or both vehicles fail to obey traffic control devices or signals or signs posted at intersections. There is a need to provide for a system and method to avoid or mitigate intersection collisions between vehicles.

SUMMARY

In one embodiment, the disclosure may be seen as directed to a control system for mitigating intersection crashes. The system comprises an electronic control module equipped with memory and in communication with at least one radar sensor sensing system. In addition, there is at least one environmental sensing system, a vehicle stability control system, at least one operator advisory system, and at least one of a brake control system, a controllable steering system, and powertrain controls.

The electronic control module may be at least one of an electronic control unit (ECU), a restraint control module (RCM) or an intersection entrance advisor module (IEA). The environmental sensing system may include those environmental sensors equipped with a vehicle to achieve active safety functions associated with an adaptive cruise control, a collision mitigation system, a lane change assist system, a blind spot detection system, a set of side impact crash sensors, a set of frontal impact crash sensors, at least one pre-crash sensor, a global positioning system (GPS), and a GPS navigation system with a digital map. The host vehicle further is equipped with a vehicle stability system that includes at least one of the yaw stability control, roll stability control, and lateral stability control. The advisory indicator may include haptic, auditory or visual warnings.

In another embodiment, the disclosure relates to a method to avoid or mitigate vehicle intersection crashes. One method may comprise determining whether a vehicle is entering into an intersection, determining whether a vehicle operator is responding correctly to sensed conditions in the intersection, activating a brake control system to pre-charge the brakes while approaching or in the intersection, determining the intersection threat classification, determining whether an intersection hazard is imminent, activating an accident mitigation advisor system, reducing intersection engine torque, determining whether to steer clear of the hazard, activating intersection steering assist by controllable steering system, activating intersection steering assist by controllable braking system, determining whether the drive is initiating driver brake so as to provide intersection braking assist when the driver braking is deemed as insufficient, and activating intersection accident mitigation automatic braking system.

DETAILED DESCRIPTION

Turning now to the Figures, wherein like numbers refer to like structures, control system to mitigate intersection collision that is carried by a host vehicle is generally designated 10 and is equipped with at least one electronic control module 12, having memory and data tables or other system operating instructions resident therein. The memory may be RAM, FLASH, PROM, EPROM, EEPROM or any other memory. The ECM 12 may be a new vehicle system level electronic control unit (ECU) called safety ECU, or it may be one of the existing ECUs such as a restraint control module (RCM) or a brake control ECU. The ECM 12 also includes an Intersection Entrance Advisor Module (IEAM), or any other module, or combination thereof.

Figure 4A:
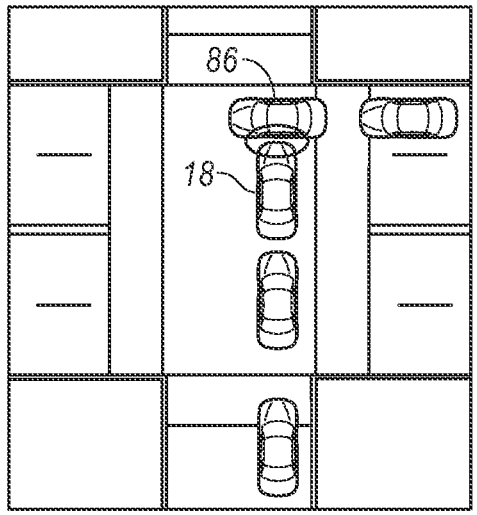
FIG. 4A is a schematic representation of an intersection where a target vehicle disobeys a traffic signal and enters the intersection with a collision accident with another vehicle.
Figure 4B:
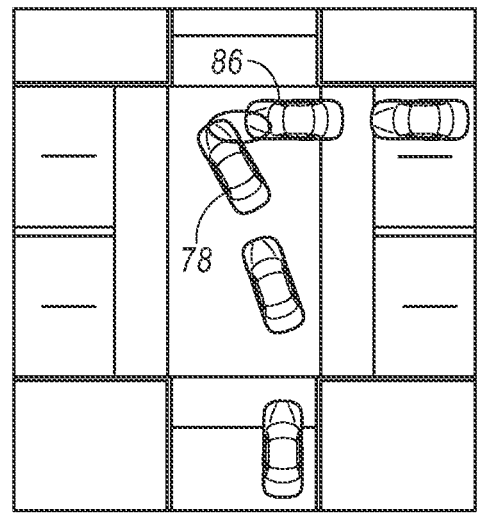
FIG. 4B is a schematic representation of an intersection where a target vehicle disobeys a traffic signal and enters the intersection while the host vehicle driver steers the vehicle.
Figure 4C:
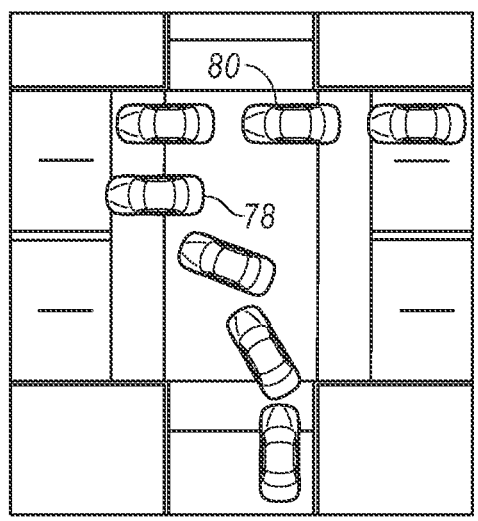
FIG. 4C is a schematic representation of an intersection where a target vehicle disobeys a traffic signal and enters the intersection with host vehicle driver steering and with the activation of one system of the present application.

A radar sensor system 14 is in electronic communication with the ECM. While radar system 14 might be replaced by a CMOS or CCD camera system, the current invention will focus on radar system for illustration simplicity. The radar system is generally possessed of a relatively short range and has a relatively wide angle filed of view. In one embodiment, the radar might have a range from about 0.1 m to about 60 m and a relative wide angle of view of about 60 degree. The radar sensors are preferably mounted at the front corners of the vehicle (as seen in FIG. 4A-C), in close proximity to some of the sensors that form part of the vehicle environment sensor system.

The radar system is used together with the vehicle environment sensor system 16, which might include CMOS and CCD camera, lidar, and the other radar systems such as short range radars, long range radars, far infrared sensors, etc., also in electronic communication with the ECM, to determine whether a host vehicle is entering into an intersection improperly, and further whether there is/are (an) other target vehicle(s) which might enter into the future path of the host vehicle within a very short period of time around that intersection.

The vehicle environment sensing system includes pre-crash and crash sensors, oriented at various points of the vehicle as is well known to those skilled in the art. Specifically, there are front, rear and side oriented pre-crash and crash sensors as is readily understood by those skilled in the art. The vehicle environmental sensing system may also include those used for safety functions associated with adaptive cruise control, collision mitigation system, lane change assist system, blind spot detection system, side impact crash sensors, frontal impact crash sensors, at least one pre-crash sensor, a GPS system, and a GPS navigation system.

The system 10 further includes a vehicle stability system 18, in electronic communication with the ECM and the other sensors necessary for achieving the vehicle stability control features, and provides information to the ECM regarding yaw stability control, lateral stability control, and roll stability control. An operator advisory system 20 is in electronic communication with the ECM, and provides data indicative that a warning should be sent to the driver of the host vehicle. The warning may be visual, such as a warning light and text on the vehicle's message center display or any other visual warning to the driver; or audio, such as a warning from vehicle chimes or electronic word or symbol message said from vehicle speakers or other audio such as a buzzer, bell or other sound signal to the driver indicating that an alarm situation exists; or haptic, such as a haptic steering wheel, a haptic acceleration pedal, a haptic seat, a haptic seatbelt pre-tensioner, or any other structure to vibrate or otherwise move to indicate that an alarm situation exists. The system further includes at least one of, and preferably all of a brake control system 22, a steering control system 24, preferably an automatic front steering system (AFS) or electronic power assist steering system (EPAS), and an powertrain control system 26. In one embodiment, the brake control system and the steering control system are engaged when a pre-crash hazard is detected.

The system may further include a restraint control module 28 that activates various safety systems and restraint systems in the vehicle when it receives instructions either from the ECM 12, or data from the pre-crash sensors that are part of the vehicle environmental sensor system 16 indicative that a crash situation or a pre-crash situation exists. In such event, the seatbelt(s) will be pre-tensioned, and the air bag systems, as necessary, will be prepared for firing. In addition, the system may include an intersection entrance advisory module (IEAM) 30 that is in communication with the ECM and the vehicle environmental sensor system that may include a global positioning system such that in response to appropriate data from the vehicle environmental sensor system, the IEAM registers that the vehicle is approaching or in an intersection and then, through communication with the ECM and other components in the system as previously described, various other aspects of the system can be activated as appropriate to the data signals received by the IEAM.

The Intersection Entrance Advisor (IEA) module uses the info from GPS receiver and a GPS navigation system with digital map—e.g., from an advanced driver assist system (ADAS) system—to determine the entrance of a host vehicle to an intersection. It can also use the other available environmental sensors to refine the determination if the host vehicle is entering the vicinity of an intersection. Generally, the host vehicle equipped GPS and GPS navigation system will likely provide various characterizations of an intersection such as 1) whether the intersection is a black spot where many accidents might have happened previously, 2) whether the intersection is a busy intersection, 3) the intersection speed limit, and 4) the intersection road condition such as the road friction level, and based on this intersection characterization, warning signals may be sent out through the aforementioned visual, audio, haptic warning mechanisms when the time-to-intersection is below certain threshold, for instance, 10 seconds.

The time-to-intersection is defined as the ratio between the vehicle distance to the intersection and the current vehicle speed. Detailed warning messages might include 1) if the intersection is a black spot; 2) if the intersection is a busy and crowded intersection; 3) if the vehicle's speed is higher than the allowed speed limit to pass the intersection 4) the current time-to-intersection if the driver maintain his travel speed; 5) the current road condition at the intersection; and 6) if the intersection has 4-way/2-way stop signs or traffic lights. Additional warning messages can be developed and used as more indicative information on road conditions is available.

The Intersection Brake Pre-charge (IBP) occurs if the drive doesn't respond to the IEA warning message, namely, there is no throttle dropping or driver initiated braking, or the vehicle speed is higher than a threshold, then a small amount of brake pressure will pre-charge the brake hydraulic system. Such a pre-charge brake pressure prepares the brake hydraulic system to eliminate time delays but it does not introduce noticeable motion disturbance to the vehicle. A good value for such a pre-charge pressure would be in the range of 2 to 5 bar.

More specifically, IBP uses the following info to determine if the pre-charge brake pressure request will honored and sent to the brake control ECU: 1) after the intersection entrance advisor initiates a warning signals sent to the driver, there is no driver response or intent change; 2) and the time-to-intersection is below a threshold such as 5 seconds, and 3) the vehicle speed is above the intersection speed limit.

Intersection Threat Classification (ITC) occurs as soon as the system determines that the host vehicle is entering the vicinity of an intersection after LEA and/or IBP is initiated. The intersection threat classification module is initiated, and, if the time-to-intersection is below another threshold (e.g., 3 seconds), the on-board sensors including both motion and environmental sensors together with the vehicle body/interior sensors will be used to determine the driver's turning intent (right turn, left turn or straight driving), and to detect if another vehicle suddenly appears in the curse of crash of the host vehicle at the intersection; or predict if the host vehicle and an approaching vehicle will likely to be hit with each other if they are keeping the same motion momentum in the near future.

The system function is targeted to the bullet vehicle which might initiate an impact to the other vehicle. If the system equipped to the bullet vehicle determines that the likelihood of an imminent crash or collision is high, the driver advisory module (the Intersection Accident Advisor (IAA)) is initiated which provides an audio warning or visual warning to the driver. The IAA might also physically alert the driver by intermittently but lightly vibrating (haptic signal) such as, for example the brake petal, the gas petal, the steering wheel, or the seatbelt if the seatbelt pre-tension can be controlled. The IAA is initiated after ITC shows a potential crash with another vehicle if the vehicle is kept at the current motion or speed trend.

The powertrain controller might be initiated to control the engine torque while the host vehicle is in the vicinity of a dangerous intersection. The Intersection Engine Torque Reduction (IETR) is engaged if the IAA sends out a warning message and the system confirms that the likelihood of a collision is high. When the IETR module is initiated, it reduces or cuts the engine torque output even if the driver does not drop throttle, since the driver might panic. The IETR is designed to be phased out if the intersection hazard is cleared or the vehicle is outside of the vicinity of a dangerous intersection. The IETR may have priority over the other engine torque reduction requests used in electronic stability control, roll stability control, and traction control.

The Intersection Steer Assist by Braking (ISAbB) is activated if the system determines that a collision is unavoidable without electronically steering and driver steering the vehicle, a brake-steer action will be initiated. Such a brake-based steer assist function achieves two goals at once. The ISAbB brakes the vehicle to slow down the vehicle and provides differential braking to make the vehicle over-steer (in opposite to the over-steer control of ESC) so as to achieve crash avoidance steering assist in case that the driver's steering is not enough to avoid or mitigate a collision. In one embodiment, the ISAbB may have overlay with the driver's braking and it redistributes the tire forces in a direction which is in alignment with the driver's steering intent but adding more steering capability. If the driver does not initiate accident avoidance steering, ISAbB module will not be activated. From this point of view, ISAbB function enhance the driver's accident avoidance steering if the driver's steering is not enough to mitigate an accident which is likely the case. Although this achieves limited accident avoidance performance, many problematic issues associated with other scenarios or failure modes might be avoided. The driver steering independent ISAbB or the scenario dependent steering assist is possible only if the vehicle has enough environmental sensor and the dedicated radar sensor 14 to monitor the surroundings to plan for a safe path.

The Intersection Steer Assist by EPS or AFS (ISAbS) is activated if the system determines that a collision is unavoidable without electronically steering or driver steering the vehicle. The ISAbS provides a controllable steering based steer assist if the vehicle is equipped with EPAS or AFS. ISAbS also achieves two goals at once. First it assists the driver to steer properly, and secondly it prevents the driver from initiating wrong steering actions which might worsen the situation or generate other problems. The driver steering independent ISAbS or the scenario dependent steering assist might be possible only if the vehicle has enough environmental sensor and the dedicated radar sensor 14 to monitor the surroundings to plan for a safe path.

The Intersection Brake Assist is activated if the system determines that a collision is unavoidable. As the vehicle prepares to mitigate damage and injuries by activating IBA module, the IBA applies additional brake on top of the driver braking so as to avoid not enough braking due to the panic reaction of the driver. The braking commend requests a master cylinder pressure of the following form:

$$\Delta p_k = k_p \left( \frac{v_{x_k}}{d_k} - f_{pdb} \right) + k_d \left( \frac{v_{x_k}}{d_k \Delta t} - \frac{v_{x_{k-1}}}{d_{k-1} \Delta t} - f_{ddb} \right)$$

where $\Delta p_k$ is the incremental brake pressure to master cylinder, $v_{x_k}$ and $v_{x_{k-1}}$ are the current and the past vehicle velocities at the time instant k, $d_k$ and $d_{k-1}$ are the current and past distances to the intersection at the time instant k, $f_{pdb}$ and $f_{ddb}$ are deadbands, $k_p$ and $k_d$ are two gains.

The Intersection Automatic Braking (IAB) is activated if the system determines that a collision is unavoidable due to the fact that 1) a confirmed target vehicle is in the host vehicle's path around the vicinity of the intersection; 2) the relative position between the host vehicle and the target vehicle is below a threshold and 3) the driver doesn't take any accident avoidance measure such as steering or braking. This activation is similar to CMbB function but will likely to allow larger deceleration up to the limit of the road instead of a pre-scribed value in order to reduce the severity of the intersection accident.

Figure 6:
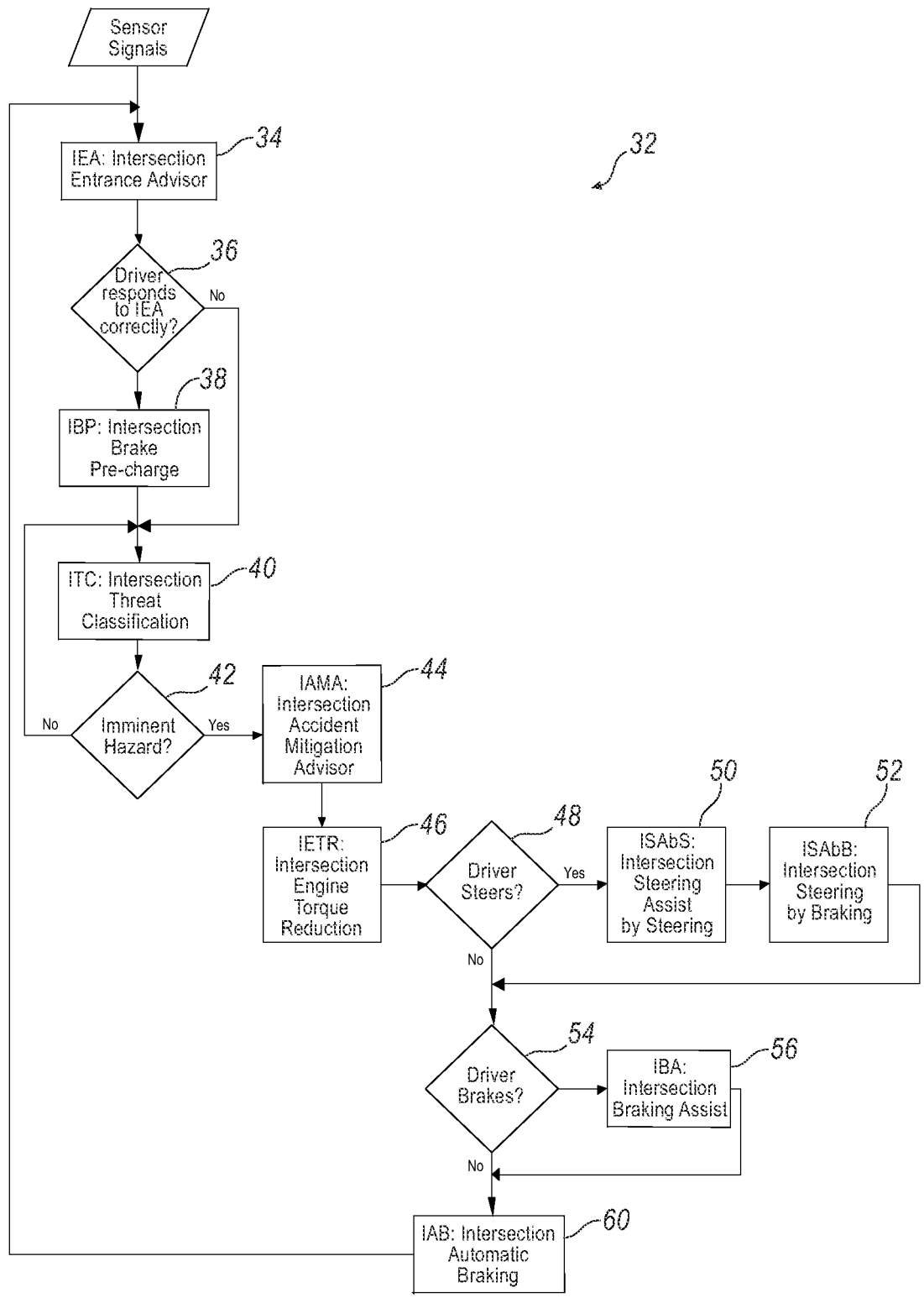
FIG. 6 is a software flow chart showing one embodiment of the method to mitigate intersection accidents according to the present application.

Having described one embodiment of the system of the present application, FIG. 6 is a software flow chart of one method 32 to mitigate vehicle intersection crashes. Step 34 is determining whether a vehicle is entering into an intersection. This may be accomplished by the vehicle environmental sensor system that includes GPS navigation system with digital map or other information to indicate that the vehicle is entering into an intersection. Step 36 is determining whether a vehicle operator is responding correctly to sensed conditions in the intersection. This may be accomplished by the operator advisory system, that evaluates driver response to the warning to entering into the intersection and determines whether the response is appropriate for an impending hazard. Step 38 is activating a brake control system to pre-charge the brake hydraulics with a nuisance caliper pressures while in the intersection. Once the operator advisory system has determined that driver response is not adequate to avoid a collision with a target vehicle, step 40 is determining the intersection threat classification. This is performed by the vehicle environment sensor system that includes pre-crash sensors and the dedicated radar 14. In the event the driver does not respond correctly in step 36, the software proceeds directly to step 40. Step 42 is determining whether an intersection hazard is imminent. This is performed by the radar system as well as the pre-crash sensors. In the event no hazard is imminent, the software loops back to step 40. Step 44 is activating an accident mitigation advisor system, which has preset instructions for emergency handling guideline in memory indicative of the various options and actions that should be taken to mitigate or avoid collision with a target vehicle, depending upon the sensed hazard and other conditions. Step 46 is reducing intersection engine torque through the powertrain control ECU to reduce engine speed and power. Step 48 is determining whether the driver is steering the vehicle. If it is determined that the driver is steering the vehicle and if the driver is steering the vehicle towards a safe path, step 50 is to activate intersection steering assist of the steering system. This will assist the driver to turn the vehicle during an imminent crash event when the driver is taking proper measure to steer away from a crash. At the later stage of the steering assist, the vehicle tire force is likely to be saturated and the steering would not generate much vehicle turning. Hence a further steering by braking is performed at step 52 to achieve two objectives here: to further steer the vehicle when front tires are saturated and to take away the vehicle's kinematic energy to slow down the vehicle. The process continues to step 54. If step 48 determines that the driver has not yet taken action to turn the vehicle, the process will also continue to step 54. Step 54 is determining if the driver is braking. If it detects that the driver is initiating driver braking, for example, to prevent or mitigate an impending collision, then step 56 is activating intersection braking assist system that will help add more brake pressure in the brake system if in case the driver's brake is not enough for an imminent danger while in the intersection. Step 60 is activating intersection automatic braking to mitigate any collision event and to stop the vehicle safely. Step 60 may also be performed directly from step 54 if it determined that the driver is not braking in face of an imminent crash. After step 60, the method then loops back to step 34 in a closed loop fashion.

Intersection operations can be more problematic for older drivers due to the aforementioned requirement of complex speed-distance judgments under time constraints.

Figure 1:
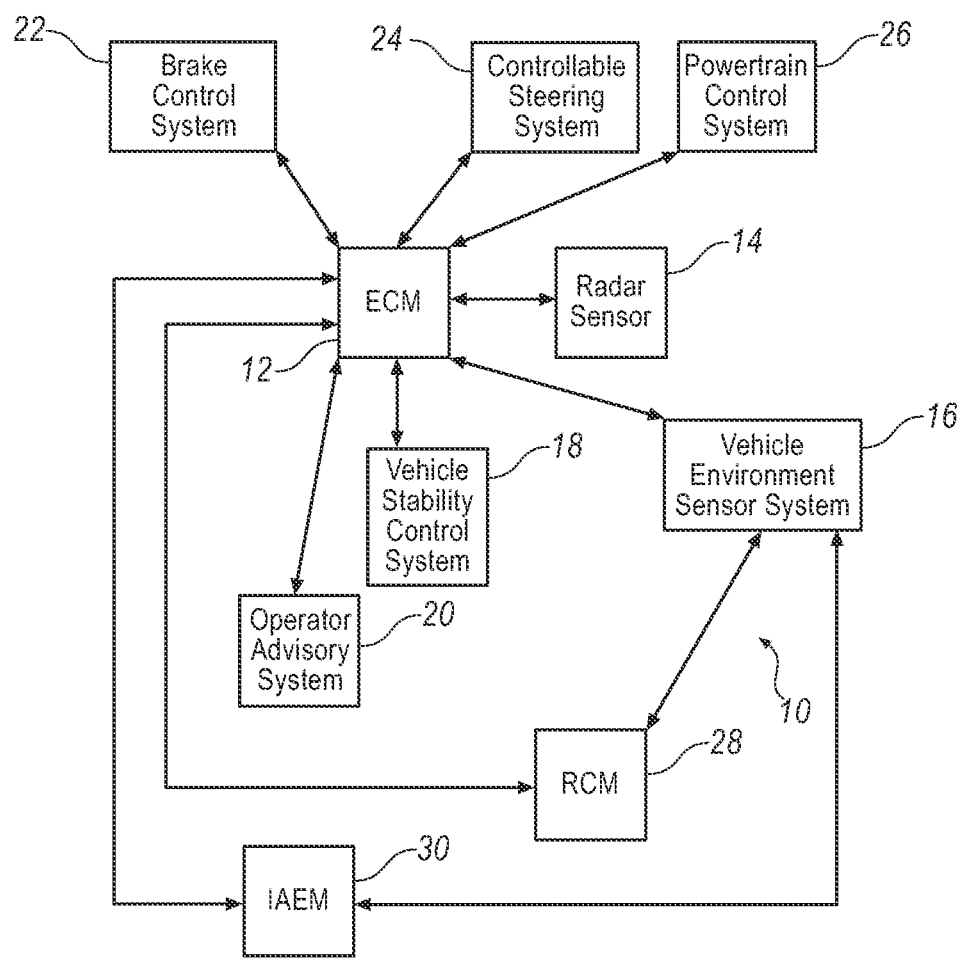
FIG. 1 is a schematic representation of one system according to the present application.
Figure 2:
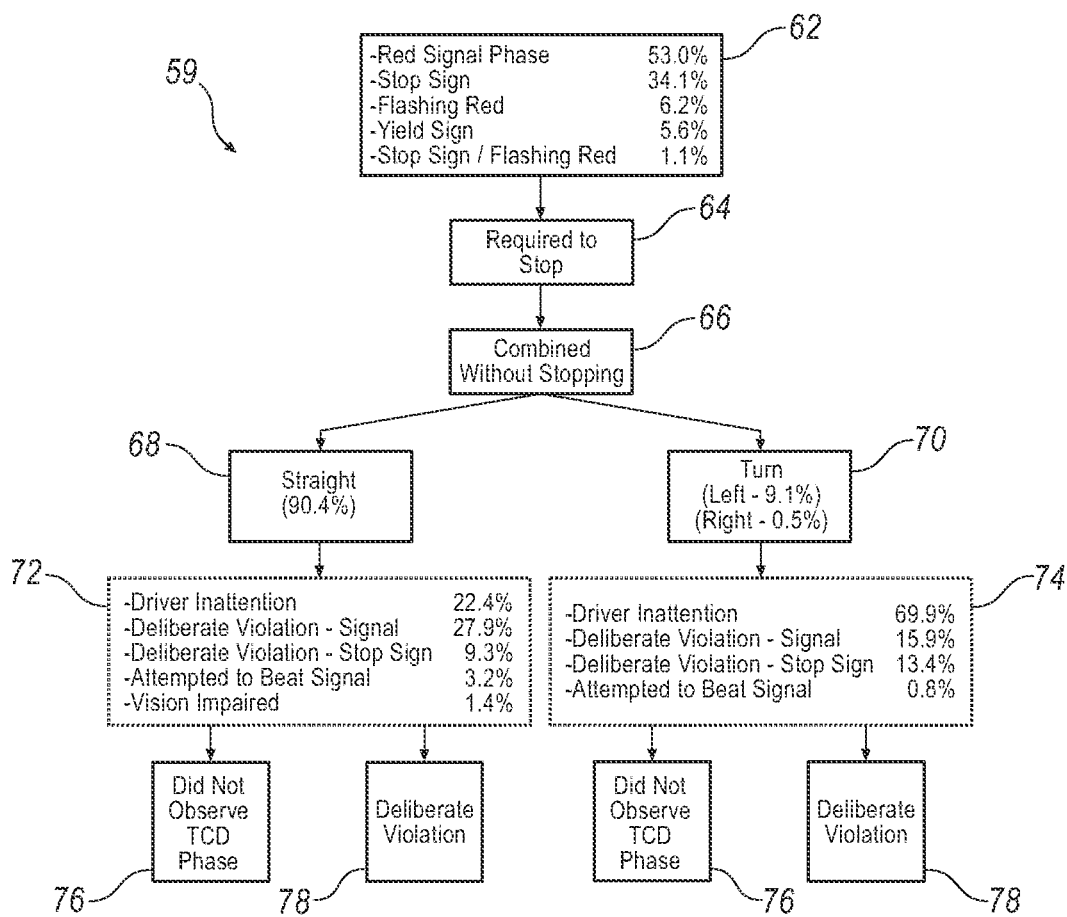
FIG. 2 is a schematic representation of a flow chart showing the steps involved when a vehicle does not obey a traffic signal or sign and wrongly enters an intersection.

Having described one system and method of the present application, FIG. 2 is a schematic representation of accidents happened on intersection. By studying this accident statistics, the safety benefit of the aforementioned method will be further confirmed. Intersection accident scenarios can be understood as a distribution of intersection crash scenarios. The Intersection accident scenarios can be cast into 4 categories. Category 1 is left turn across the path of travel, which is seen 23.8% of the time. Category 2 is following a perpendicular path entry with inadequate gap, which is seen about 30.2% time. Category 3 is follow a perpendicular path in violation of traffic control or signal, which is seen in about 43.9%, and premature intersection entry in violation of traffic control or signal occurs in about 2.1% of cases.

The crashes in category 3 above form the largest proportion of intersection crash cases, comprising 43.9% of the incidences. In such a scenario, the subject vehicle is required to stop for a traffic control. The subject vehicle may violate the traffic control and enter the intersection. The characteristics or steps associated with this scenario or thought method 59 are illustrated in FIG. 2.

Specifically, step 62 shows the various traffic control devices, such as signals or signs that occur that may be disregarded when a vehicle wrongly enters into an intersection. In this regard, red signals phase of the traffic light, stop signs, flashing red signals, yield signs and stop sign/flashing red light are represented as the most common traffic signs or signals associated with an intersection. As can be seen in FIG. 2, red signal phase of the traffic light form 53.0% of the traffic warnings about entering an intersection, and stop sign by itself forms about 34.1% of such intersection signs or warnings. Together, these tow account for 87.1% of all traffic signals and signs seen at intersections.

Step 64 in the process of wrongly entering an intersection (the requirement of traffic control) is that, in response to such signals as set forth above, the host vehicle is required to stop. However, in the scenario of wrongly entering an intersection, the process continues to step 66, which is, driver responses to the traffic control. In this scenario, the vehicle continues to proceed without stopping. At this juncture, the driver may understand that he has wrongly entered into an intersection. There are two courses of action, or intended maneuvers that are seen. The driver can continue in a straight direction, as seen in step 68, which constitutes about 90.4% of the responses, or the driver can turn right or left, which constitutes about 9.6% of responses. If the driver decides to turn, it can be seen that left turns occur about 9.1% of the time, and right turns occur about 0.5% of the time.

In the event step 68 is followed, step 72 shows the various reasons, or causal factors, why the driver decided to proceed in the manner chosen. For example, driver inattention may account for about 22.4% of the times a driver wrongly proceeds through an intersection Other reasons included deliberately violating the signal (27.9%), deliberately violating a stop sign (9.3%), attempting to beat a signal (3.2%) and being vision impaired and not being able to see the signal/sign (1.4%).

Similarly, in the event step 70, which is also a causal factor, is followed, step 74 shows the various reasons whey the driver decided to proceed in the manner chosen. In this scenario, driver inattention (69.9%), deliberately violating the signal (15.9%), deliberately violating the stop sign (13.4%) or attempting to beat the signal (0.8%) all play a role as a causal factor. Each of step 72 and 74 result in critical driver error. These critical errors are that the driver did not observe the traffic control device (TCD) phase 76, or the action constituted a deliberate violation as seen in 78.

Figure 3:
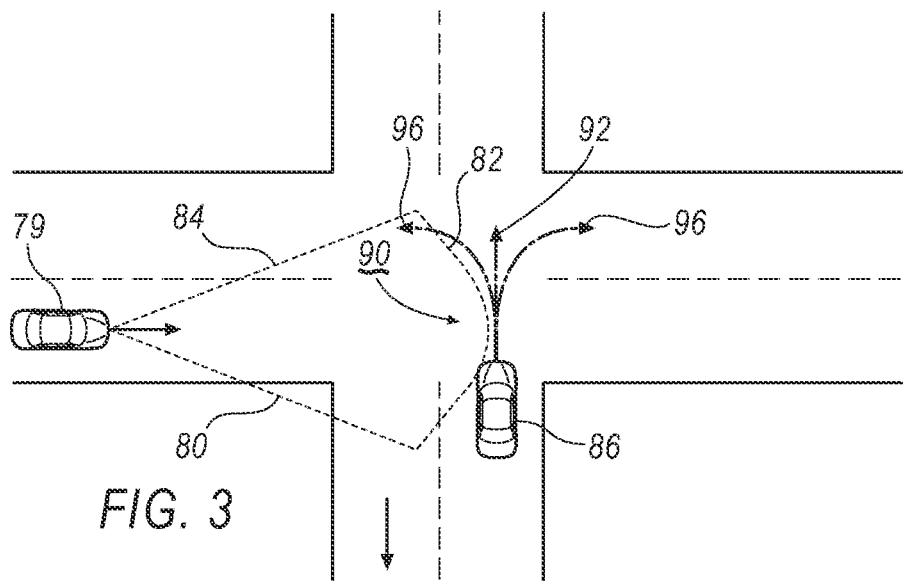
FIG. 3 is a schematic representation of a host vehicle equipped with short range radar sensors showing coverage for various turns of a target vehicle.

Turning to FIG. 3, there is depicted a host vehicle 79 equipped with necessary environmental sensors, a driver advisory system, a vehicle stability control system such as ESC/RSC, and a controllable steering system such as an EPAS or AFS system. Generally, the driver advisory system includes an audio warning or a visual display. The environmental sensing system could have various types of configurations including those used in adaptive cruise control, collision mitigation system, lane change assist, blind spot detection, side impact crash sensor, GPS, GPS navigation system with digital map, etc. The vehicle stability control system includes the control functions such as the yaw stability control, the roll stability control, and the lateral stability control. Moreover, the involved actuations could include braking controls, powertrain controls, an EPAS control, and an AFS control.

As seen in FIG. 3, the host vehicle is equipped with short range radar sensor 80 at each of the front left and front right corners on top of the existing pre-crash sensors. FIG. 3 shows one of the radar with the view angle limited by 80 and 84 and the review distance range limited by 82. The scene shows the sensor coverage of the host vehicle 79 for the target vehicle 86 to conduct a left turn. In the present application, the brake-steer to assist a driver for better steering to avoid a crash and combining brake-steer with environmental sensor can also be achieved through controllable steering systems. The radar senses the target vehicle as it wrongly enters the intersection. The target vehicle 86 could continue straight through the intersection in direction 92 or may turn right as seen at 94 or turn left, as seen at 96, but turning to the left can lead to potential crash with vehicle 79.

Thus it can be seen that FIG. 4A depicts where a driver enters into an intersection without effecting and corrective steering action. If the target vehicle 86 disobeyed a traffic light by crossing the intersection, it is likely to cause the host vehicle 18 to crash on the left side of the target vehicle 86 even if the driver in the host vehicle 18 tries to brake or the collision mitigation system function is initiated. Due to the later detection of the crash hazard, the collision mitigation system equipped with the host vehicle 18 is unlikely to be effective in mitigating the collision.

In order to avoid the crash, the driver of the host vehicle 78 in FIG. 4B might try to steer the vehicle while dropping throttle or braking the vehicle. Due to the imminent and emergency nature, the host vehicle driver's steering or the combination of steering, braking, throttling action is unlikely to achieve a perfect sequence for avoiding such a crash. The panic reaction or the less experience in dealing with such a highly dynamic situation might even worsen the situation. The host vehicles 78 might end up with an angled side collision with vehicle 86 while vehicle 86 suffers front collision as depicted in FIG. 4 B.

Now consider the driver steer assist during this situation as seen in FIG. 4C. The system starts sending out advisory info to the driver way before the potential intersection crash could happen. If the driver of the host vehicle 78 disregards the warning and the sensing system detects an imminent intersection crash, the system will enforce the vehicle steer through redistributing the braking force or using EPAS/AFS as soon as the driver tries to steer such that the host vehicle can be steered or moved to the safe path, in this case, which is more in a parallel direction with the target vehicle 80. In this way, the angled collision to the involved vehicles can be either totally avoided or transformed in to a light sideswipe, which is less severe than the angle side or front collision.

Figure 5:
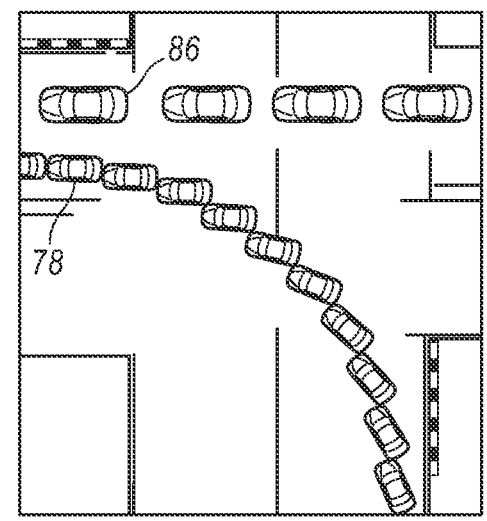
FIG. 5 is a schematic representation of an intersection where a target vehicle disobeys a traffic signal and enters the intersection with host vehicle driver steering and with activating one system of the present application showing a snapshot of simulation to achieve intersection steer assist through braking to mitigate intersection accident.

FIG. 5 is a snapshot of a simulation to achieve intersection steer-assist through braking so as to mitigate the intersection accident. Notice that the host vehicle 78 completely avoids the collision with the target vehicle 86 by adequate warning and steering and braking of the host vehicle.

The words used to describe the embodiments off the invention are words of description and not words of limitation. Many variations and modifications will become apparent to those skilled in the art without departing from the scope and spirit of the invention as set forth in the appended claims.

We claim:

1. A control system to mitigate intersection crashes, comprising:
an electronic control module equipped with a memory and in communication with at least one radar sensor sensing system, at least one environmental sensing system, at least one vehicle stability control system, at least one operator advisory system and at least one of a brake control system, a controllable steering system, an electronic power assisted steering system, and a powertrain control system, said system configured to:
evaluate a driver response to a warning provided to the driver by the system, the warning indicative of anticipated entrance of a host vehicle into an intersection,
pre-charge said brake control system according to criteria including driver input indicative of a corrective response to the provided warning not being received, the pre-charge being applied to a predetermined level in order to reduce time delay in braking without introducing a noticeable motion disturbance to the host vehicle, and
utilize the pre-charged brake control system to invoke brake-based steer assist to augment received crash avoidance steering input.

2. The system of claim 1, wherein the environmental sensing system includes sensor elements for adaptive cruise control, collision mitigation system, lane change assist system, blind spot detection system, side impact crash sensors, frontal impact crash sensors, at least one pre-crash sensor, global positioning system, and global positioning system for navigation with digital maps.

3. The system of claim 1, wherein the vehicle stability control system is at least one of a yaw stability control system, roll stability control system, and lateral stability control system.

4. The system of claim 1, wherein the brake control system and the power assisted steering system are engaged when a pre-crash hazard is detected.

5. The system of claim 1, wherein the operator advisory system is haptic, auditory or visual.

6. The control system of claim 1, wherein the memory includes an intersection entrance advisor module that is configured to receive global positioning system data to determine the entrance of the host vehicle to the intersection, the control system being configured to characterize the intersection based on the global positioning system data and to provide warning signals based on the intersection characterization.

7. A control system to mitigate intersection crashes, comprising:
an electronic control module equipped with a memory;
at least one radar sensor sensing system;
at least one environmental sensing system;
at least one vehicle stability control system;
at least one operator advisory system; and
at least one of a brake control system, a controllable steering system, an electronic power assisted steering system, and a powertrain control system;
wherein the electronic control module is configured for selective communication with each of the at least one radar sensor sensing system, at least one environmental sensing system, at least one vehicle stability control system, at least one operator advisory system and the at least one of brake control system, controllable steering system, electronic power assisted steering system, and powertrain control system, said system configured to:
provide a warning indicative of anticipated entrance of a host vehicle into an intersection,
evaluate a driver response to the warning provided to the driver by the system,
pre-charge said brake control system according to criteria including driver input indicative of a corrective response to the provided warning not being received, the pre-charge being applied to a predetermined level in order to reduce time delay in braking without introducing a noticeable motion disturbance to the host vehicle, and
utilize the pre-charged brake control system to invoke brake-based steer assist to augment received crash avoidance steering input.

8. The control system of claim 7, wherein the memory includes an intersection entrance advisor module that is configured to receive global positioning system data to determine the entrance of the host vehicle to the intersection, the control system being configured to characterize the intersection based on the global positioning system data and to provide warning signals based on the intersection characterization.

9. The system of claim 1, wherein the driver input indicative of a corrective response includes at least one of input indicative of throttle dropping, input indicative of braking, and input indicative of a reduction in speed of the host vehicle.

10. The system of claim 1, wherein the electronic control module is further configured to:
provide the warning within a first predetermined threshold amount of time before entrance of the host vehicle into the intersection; and
determine that the driver input indicative of a corrective response to the provided warning is not received when the input is not received within a second predetermined threshold amount of time before entrance of the host vehicle into the intersection.

11. The system of claim 1, wherein the predetermined level of pre-charge brake pressure is in the range of 2 to 5 bar.

12. The system of claim 1, wherein the warning includes an indication at least one of: the intersection being identified as a location where accidents have happened previously, the intersection being identified as busy or crowded, the speed of the host vehicle being in excess of the speed limit of the intersection, a current time-to-intersection if the host vehicle maintains speed, current road conditions of the intersection, and a traffic control of the intersection.

* * * * *